United States Patent
Ausdenmoore et al.

[11] Patent Number: 5,820,024
[45] Date of Patent: Oct. 13, 1998

[54] HOLLOW NOZZLE ACTUATING RING

[75] Inventors: Robert M. Ausdenmoore, West Chester, Ohio; Thomas G. Wakeman, Lawrenceburg, Ind.

[73] Assignee: General Electric Company, Cincinnati, Ohio

[21] Appl. No.: 500,310

[22] Filed: Jul. 6, 1995

Related U.S. Application Data

[63] Continuation of Ser. No. 243,015, May 16, 1994, abandoned.

[51] Int. Cl.$^6$ ..................................................... B05B 12/00
[52] U.S. Cl. ............................... 239/265.35; 239/265.41
[58] Field of Search ...................... 239/265.35, 265.39, 239/265.41; 244/54, 118.2, 119; 428/167; 60/232

[56] References Cited

U.S. PATENT DOCUMENTS

| | | | |
|---|---|---|---|
| 2,984,068 | 5/1961 | Eatock | 239/265.41 X |
| 4,086,378 | 4/1978 | Kam et al. | 244/119 X |
| 4,128,208 | 12/1978 | Ryan et al. | 239/265.39 |
| 4,141,501 | 2/1979 | Nightingale | 239/265.39 X |
| 4,176,792 | 12/1979 | McCardle, Jr. | 239/265.41 |
| 4,245,787 | 1/1981 | Freid | 239/265.41 |
| 4,994,660 | 2/1991 | Hauer | 239/265.41 |
| 5,082,182 | 1/1992 | Bruchez, Jr. et al. | 239/265.35 |
| 5,102,050 | 4/1992 | Sedziol et al. | 239/265.35 |
| 5,150,839 | 9/1992 | Reedy | 239/265.41 |
| 5,174,502 | 12/1992 | Lippmeier et al. | 239/265.41 |
| 5,232,158 | 8/1993 | Barcza | 239/265.35 |
| 5,239,815 | 8/1993 | Barcza | 239/265.35 X |
| 5,261,605 | 11/1993 | McLafferty et al. | 239/265.35 |
| 5,261,606 | 11/1993 | Barcza | 239/265.35 |
| 5,262,220 | 11/1993 | Spriggs et al. | 244/119 X |

*Primary Examiner*—Lesley D. Morris
*Attorney, Agent, or Firm*—Andrew C. Hess; Wayne O. Traynham

[57] ABSTRACT

A hollow actuating ring and apparatus for actuating and/or vectoring the flaps of an aircraft gas turbine engine nozzle by transferring actuation loads from a small number of actuators to a greater number of pivotal divergent flap members of the nozzle. The actuating ring has a generally hollow annular structure including axially spaced apart coaxial forward and aft walls, struts axially extending between and structurally joining together the forward and aft walls, and a ring stiffening for decreasing the effective ring bending and torsional length of at least one of the forward and aft walls between the struts. Stiffening structure is provided for spreading out loads transferred from the struts to one of the forward and aft walls using structural braces extending diagonally between the struts and one of the forward and aft walls.

19 Claims, 6 Drawing Sheets

HOLLOW NOZZLE ACTUATING RING

This application is a Continuation of application Ser. No. 08/243,015 filed May. 16, 1994 and now abandoned.

The Government has rights in this invention pursuant to Contract No. F33657-91-D-2084 awarded by the Department of Air Force.

BACKGROUND OF THE INVENTION

1. Field of the Invention

This invention relates generally to actuating rings for axisymmetric variable nozzles and, more particularly, to a hollow actuating ring and apparatus that is used to pivot the nozzle flaps that vector the nozzle exhaust flow and thrust.

2. Description of Related Art

For military aircraft applications, there exists a need to increase the maneuverability of the aircraft both for air to air combat missions and complicated ground attack missions. Aircraft designers seek to replace or augment the use of conventional aerodynamic surfaces such as flaps and ailerons with vectorable nozzles which turn or vector the exhaust flow and thrust of the gas turbine engine powering the aircraft. Hauer in U.S. Pat. No. 4,994,660, herein incorporated by reference, discloses an axisymmetric vectoring exhaust nozzle that provides a means for vectoring the thrust of an axisymmetric convergent/divergent nozzle by universally pivoting the divergent flaps of the nozzle in an asymmetric fashion or in other words pivoting the divergent flaps in radial and tangential directions with respect to the unvectored nozzle centerline. The flaps are pivoted by an actuating ring which can be axially translated and gimballed or tilted about its horizontal and vertical axis (essentially have its attitude adjusted) through a limited range. Previously, two dimensional nozzles have used vectored thrust means that employ relatively flat flaps to direct the pitch or yaw direction of the engine's thrust.

Vectored thrust produces tangential and radial loads referred to as side loads that are transmitted from the flaps by various load paths back through the actuating ring to the engine casing through the actuators. These tremendous loads require heavy actuators to absorb the loads and particularly the bending moments exerted on the actuator shafts by thrust vectoring. Various designs have been developed to provide a means to minimize or eliminate the side loads transferred by the nozzle to the actuators and bending moments that the actuators would be subject to due to the radial loads. U.S. Pat. No. 5,174,502 to Lippmeier et al., herein incorporated by reference, discloses such designs but as in other designs the actuating ring is still 5 subject to radial and axial large loads as well as bending moments. The actuating ring needs to be rigid to prevent system distortion under vectoring loads which could lead to thrust coefficient losses, reduced vectoring angle capability, and potential instability. Flexibility in the ring allows the ring to deflect and distort under nozzle vectoring loads thereby reducing the vectoring achieved relative to a rigid kinematic 10 system. This problem is further aggravated by the relatively low number of actuators used to vector the nozzle wherein 3 is desirable. This distortion ultimately leads to reduced overall vectoring capability.

One problem faced by designers trying to increase both the torsional and bending stiffness is that the space available for the actuating ring is generally restricted by the aircraft, the internal engine flowpath, nozzle structure and the convergent actuation system. This is particularly troublesome when retrofitting existing aircraft gas turbine engine exhaust nozzle systems with vectorable nozzles, since an actuating ring was not provided for or considered in the non-vectoring original design. The space available for the ring tends to allow for a relatively flexible ring.

Two key parameters affecting ring stiffness in prior designs are the distance between actuators (a cubic effect) and the ring section properties. Assuming three actuators and a restricted ring envelope and ring diameter, increasing the ring material thickness was the method used to increase the ring's stiffness but with its associated weight addition.

SUMMARY OF THE INVENTION

Briefly, in accordance with one aspect of the present invention, a hollow actuating ring and apparatus for actuating and/or vectoring the flaps of an aircraft gas turbine engine vectoring nozzle by transferring actuation loads from a small number of actuators (3 being the preferred number) to a greater number of pivotal divergent flap members which are operable to vector the thrust and vary the exit area of the nozzle.

The actuating ring has a generally hollow annular structure including axially spaced apart coaxial forward and aft walls, struts axially extending between and structurally joining together the forward and aft walls, and a ring stiffening means for decreasing the effective ring bending and torsional length of at least one of the forward and aft walls between the struts. One embodiment provides a stiffening means that has a means for spreading out loads transferred from the struts to one of the forward and aft walls. Another embodiment provides a stiffening means that has A-frames formed between the struts and at least one of the forward and aft walls and alternatively at least one structural brace extending diagonally between each of the struts and one of the forward and aft walls. The A-frames may have filleted interior corners. More detailed embodiments of the invention provide flap actuation linkage means that are circumferentially disposed around and structurally connected to the aft ring of the structure and actuator joint means that are structurally connected to the struts. The flap actuation linkage means and the actuator joint means preferably include spherical joint elements.

Another more particular embodiment provides carved out features formed in reinforcement struts that axially extend between and further structurally join together the forward and aft walls. Preferably the annular outer and inner covers are integrally formed as a one-piece structure together with the forward and aft walls, the struts, the ring stiffening means, and the reinforcement struts. Alternatively one of the annular covers may be formed separately and joined to the one-piece structure. One embodiment of the present invention includes a nozzle having actuator rods each of which pass through conical channels carved into the reinforcement struts. Another embodiment includes spherical joints each of which is mounted in semi-cylindrical notches carved into the reinforcement struts.

In the drawings as hereinafter described, a preferred embodiment is depicted; however, various other modifications and alternate constructions can be made thereto without departing from the true spirit and scope of the invention.

ADVANTAGES

Among the advantages provided by the actuating ring and nozzle actuation apparatus of the present invention is a stiffer actuating ring that is able to transfer actuation loads from a small number of actuators to a greater number of pivotal divergent flap members without the associated weight addition of prior designs. The present invention also permits a more flexible and smaller actuating ring design that can fit within a more restricted envelope without the associated weight addition of prior designs. Actuating rings in accordance with the present invention may be designed with smaller profiles including smaller radial heights, thus allowing the overall nozzle actuation system and the nozzle itself to be more compact.

Another object of the present invention is to provide a stiff hollow actuating ring that is used to pivot the nozzle flaps that vector the nozzle exhaust flow. Another object is to provide a stiff actuating ring that can fit within a restricted envelope. Yet another object of the present invention is to provide a hollow actuating ring with a lower weight than was previously used and that helps to minimize the size and weight of the nozzle system.

These objects and other features and advantages will become more readily apparent in the following description when taken in conjunction with the appended drawings.

BRIEF DESCRIPTION OF THE DRAWINGS

The foregoing aspects and other features of the invention are explained in the following description, taken in connection with the accompanying drawings where.

DESCRIPTION OF THE PREFERRED EMBODIMENT

Figure 1:
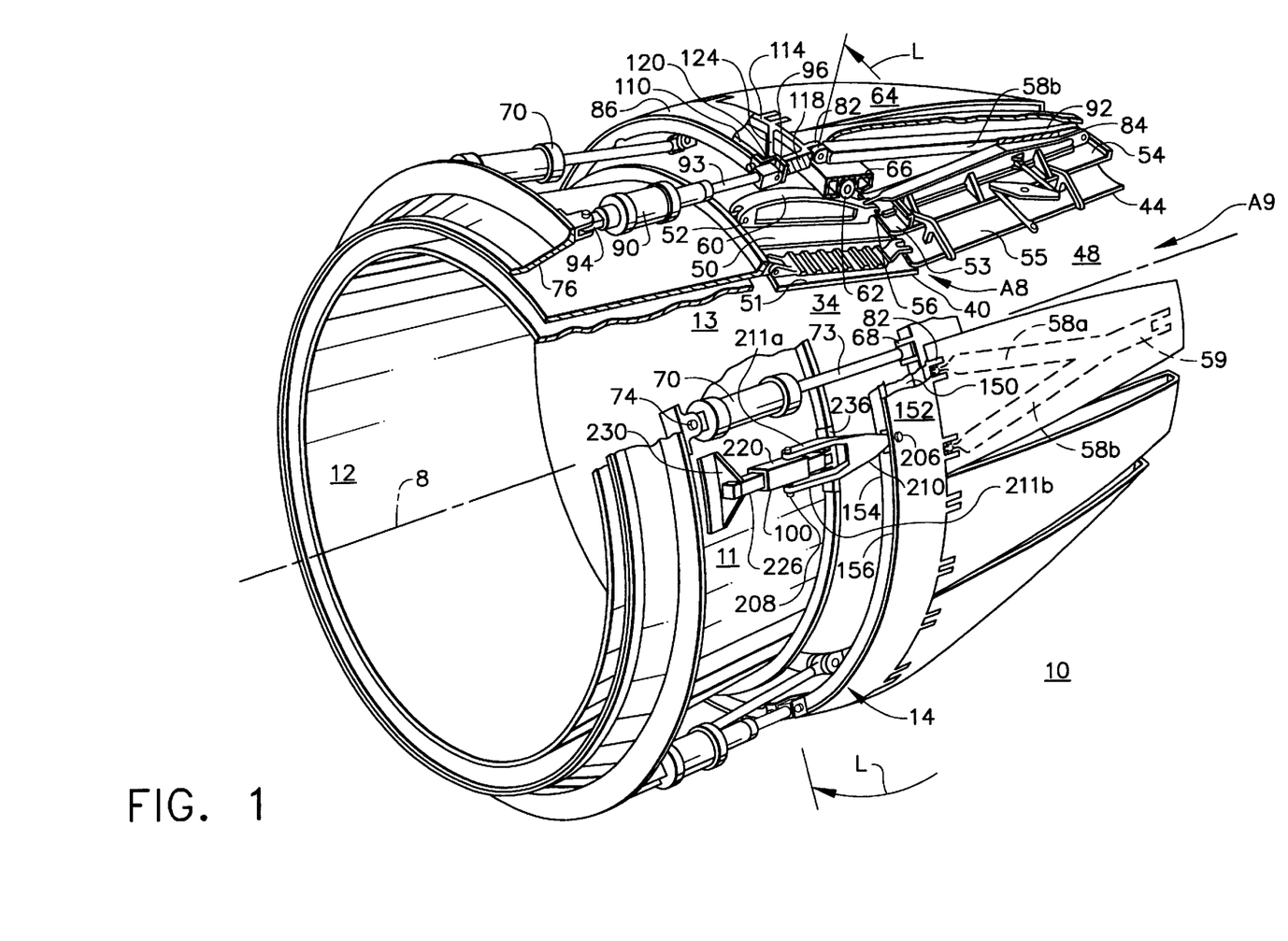
FIG. 1 is a partial cut away perspective view of a gas turbine engine axisymmetric vectoring exhaust nozzle with an actuating ring and apparatus in accordance with the preferred embodiment of the present invention.

The present invention is generally illustrated in FIG. 1 and includes an actuating ring 86 which serves as a vectoring ring for an axisymmetric vectoring nozzle 14 in an exhaust section 10 for an aircraft gas turbine engine. The exhaust section 10 comprises, in serial flow relationship, a fixed area duct or engine casing 11, including an afterburner liner 12, and a variable area downstream section 13 of the axisymmetric vectoring nozzle 14 of the convergent divergent type as referenced previously in the Hauer patent.

Referring to FIG. 1, nozzle 14 comprises in serial flow relationship a convergent section 34, a throat 40 and a divergent section 48. The convergent section 34 includes a plurality of convergent or primary flaps 50 circumferentially disposed about engine centerline 8 with overlapping primary seals 51 disposed between and in sealing engagement with the radially inward facing surface of circumferentially adjacent primary flaps 50. Primary flap 50 is pivotally attached at its forward end to casing 11 by first pivotal or clevis joint 52. A divergent or secondary flap 54 is pivotally attached at its forward end 53 to the aft end of primary flap 50 by a universal two degree of freedom (2 DOF) joint means 56 generally at an axial position in the nozzle 14 which coincides with throat 40. Secondary flaps 54 are generally circumferentially disposed about engine centerline 8 with overlapping divergent or secondary seals 55 disposed between and in sealing engagement with the radially inward facing surface of circumferentially adjacent secondary flaps 54. Throat 40 has associated with it a throat area conventionally denoted as A8 and the nozzle exit 44 is generally at the end of secondary flaps 54 and has an exit area associated with it conventionally denoted as A9.

A plurality of cam rollers 62 are disposed in a primary ring 66 which in turn is translated forward and aft by a plurality of primary actuators 70, of which there are four in the preferred embodiment. The variable throat area A8 is controlled by the action of cam roller 62 on the cam surface 60 which is formed on the back of primary flap 50. During operation the high pressure of the exhaust gases within the nozzle force primary flaps 50 and secondary flaps 54 radially outward thus keeping cam surface 60 in contact with one of the cam rollers 62. A conical annular actuator support 76 is mounted at its narrow forward end to engine casing 11 and primary actuator 70 is pivotally connected to the wide aft end of the actuator support 76 by a universal ball joint 74. Primary actuator 70 has an actuator rod 73 which in turn is connected to primary ring 66 by a spherical joint 68.

A plurality of vectoring actuators 90, of which there are three in the preferred embodiment, are equi-angularly disposed circumferentially around casing 11 and mounted to actuator support 76 by universal ball joints 94 in a similar manner as actuators 70. An actuating ring 86 is connected to vectoring actuators 90 at the aft end of a vectoring actuator rod 93 by a spherical joint 96. This provides for actuating ring 86 to be axially translated and tilted about centerline 8 in order to control its attitude. Actuating ring 86 controls the positioning or pivoting of secondary flaps 54.

Secondary flap 54 is pivotally connected to primary flap 50 by a 2 DOF universal joint means 56 and is pivotally controlled in a multi-degree of freedom manner by a plurality of respective Y-frames 59 having control arms 58a and 58b that operably connect secondary actuating ring 86 to secondary flap 54. Outer flaps 64 are at least partially supported by Y-frames 59 and provide a clean and smooth aerodynamic shape along the exterior of the nozzle.

Control arms 58a and 58b are connected to actuating ring 86 by 3 DOF spherical joints 82 and to the aft end of secondary flap 54 by a spherical joint 84.

This linkage is operable to translate an attitude change of actuating ring 86 into a multi degree of freedom pivoting change or orbital movement of secondary flap 54 whereby each secondary flap may be pivoted through a different angle. The use of spherical joints 82 to attach control arms 58a and 58b provides clevis type pivoting of Y-frame 59 while preventing any twisting loads that may be imparted to either control arms 58a or 58b from being transferred back to actuating ring 86. Backbone 15 92 provides a mount for secondary flap 54 and support for joints 84 and 56 at its two ends.

Actuating ring 86 is supported by at least and preferably three axially adjustable actuating ring support means 100, equi-angularly disposed circumferentially about casing 11, that allows actuating ring 86 to be axially translated and gimballed by vectoring actuators 90. An axially translating A-frame 210 supports actuating ring 86 by a 3 DOF spherical joint 206. The A-frame 210 is pivotally attached to the slider 220 with a clevis type hinge means 208 in the form of spherical joints at the ends of arms 211a and 211b. The use of spherical joints at the ends of arms 211a and 211b provide clevis type pivoting for A-frame 210 and also eliminate the transfer of twisting loads that may be imparted to the arms. The slider 220 is slidable along a hollow slider bar 226 that is attached to the engine casing 11 by a forward bracket 230 and an aft bracket 236. The actuating ring support means 100 permits the actuating ring 86 to translate axially forward and rearward and tilt so as to change its attitude. A more detailed description of the actuating ring support means 100 may be found in U.S. Pat. No. 5,174,502, by Lippmeier et al., entitled "Support for a Translating Nozzle Vectoring Ring", herein incorporated by reference.

Figure 2:
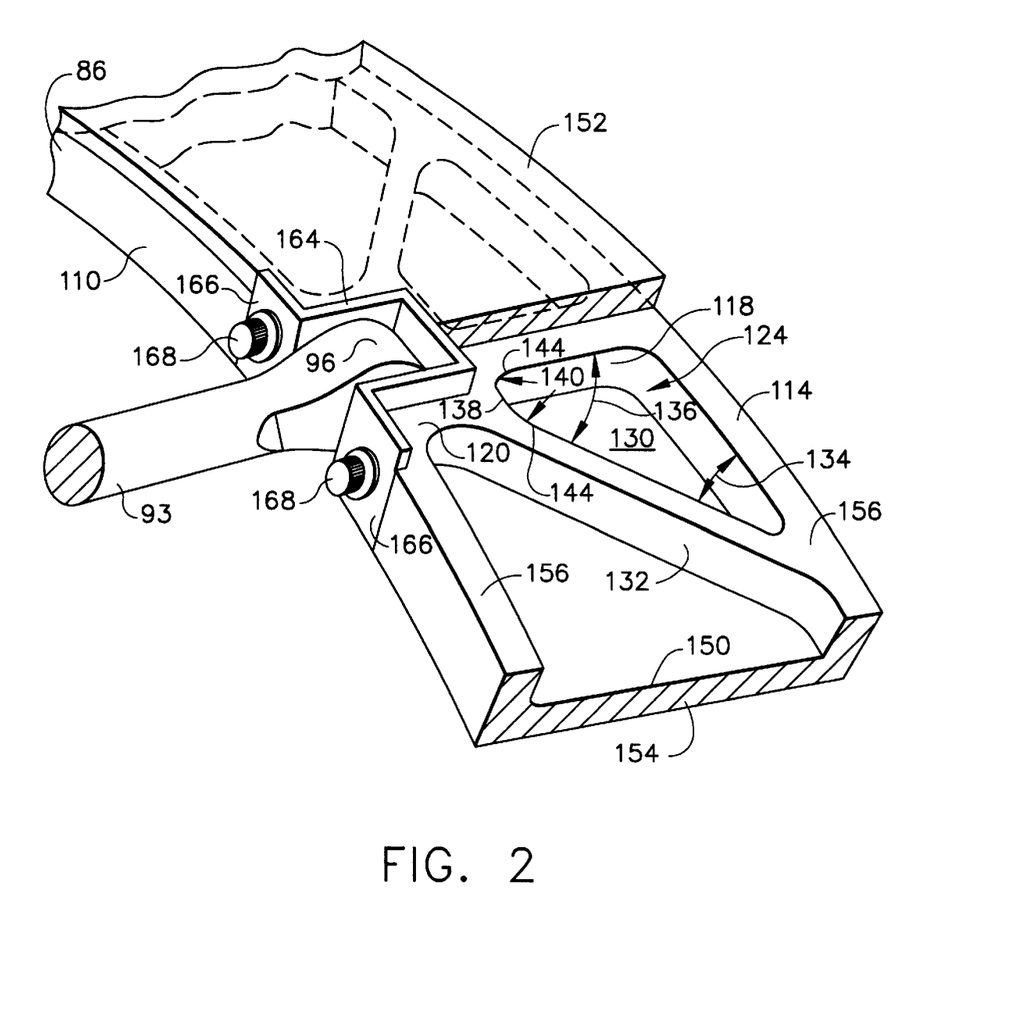
FIG. 2 is an enlarged partial cut away perspective view of a portion of the actuating ring in FIG. 1 illustrating an embodiment of the stiffening means of the present invention.

Referring now to FIG. 2, the hollow actuating ring 86 is a hollow generally annular structure having axially spaced apart coaxial forward and aft walls 110 and 114 respectively. Joining struts 118 axially extend between and structurally join together the forward wall 110 and the aft wall 114. The actuator rods 93 are attached by the spherical joint 96 to the actuating ring 86 at a base 120 of the struts 118. A ring stiffening means generally shown at 124 is provided for decreasing the effective ring bending and torsional length L (also see FIGS. 3 and 4) of the aft wall 114 between adjacent struts 118. This is accomplished by spreading out loads transferred from the struts 118 to the aft wall 114. An A-frame 130 is formed between each one of the struts 118 and the aft wall 114. The A-frame 130 provides a structural brace 132 extending diagonally between each of the struts 118 and the aft wall 114. The A-frames are preferably provided with filleted interior corners 134. Note that the filleted interior corner 134 nearest the base 120 is modified by adding a spacer section 138 to form an effective interior acute angle corner 136 which has two fillets 140 in its sub-corners 144.

Figure 2A:
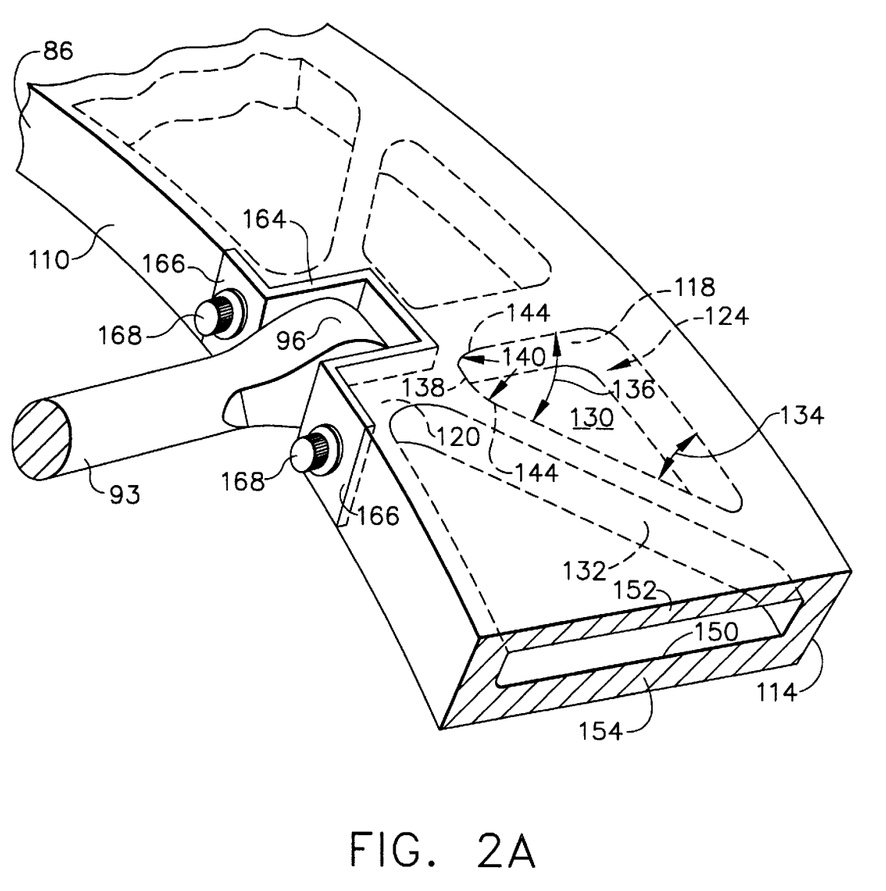
FIG. 2A is an enlarged partial cut away perspective view of a portion of the actuating ring in FIG. 1 illustrating a one-piece stiffening ring means in accordance with the preferred embodiment of the present invention.

Annular inner and outer covers 150 and 152 respectively are structurally joined to radially inner and outer ends 154 and 156 respectively of the corresponding forward and aft walls thereby completing the outer structure of the hollow actuating ring 86. The annular inner and outer covers 150 and 152 respectively are also structurally joined to the ring stiffening means 124. In the preferred embodiment the inner and outer covers 150 and 152 respectively, the structural brace 132, the struts 118, and the forward and aft walls 110 and 114 respectively, are all integrally formed as an essentially one-piece structure by casting or some other means as illustrated in FIG. 2A. A lost wax or investment casting method that is well known in the industry may be used. The term "essentially one-piece structure" refers to the fact that it may be necessary to plug weld the drainage holes used in the lost wax method. Alternatively, one of the inner and outer covers 150 and 152 respectively, the structural brace 132, the struts 118, and the forward and aft walls 110 and 114 respectively, may be all integrally formed as one piece by casting or some other means and the other of the inner and outer covers 150 and 152 respectively is separately formed and then joined to these parts by welding, brazing, diffusion bonding or some other joining means. The spherical joint 96 connects the actuator rod 93 to the base 120 of the strut 118 with the use of a hinge bracket 164 having two circumferentially spaced apart flanges 166 that are attached to the base of the strut by two circumferentially spaced apart screws 168.

Figure 3:
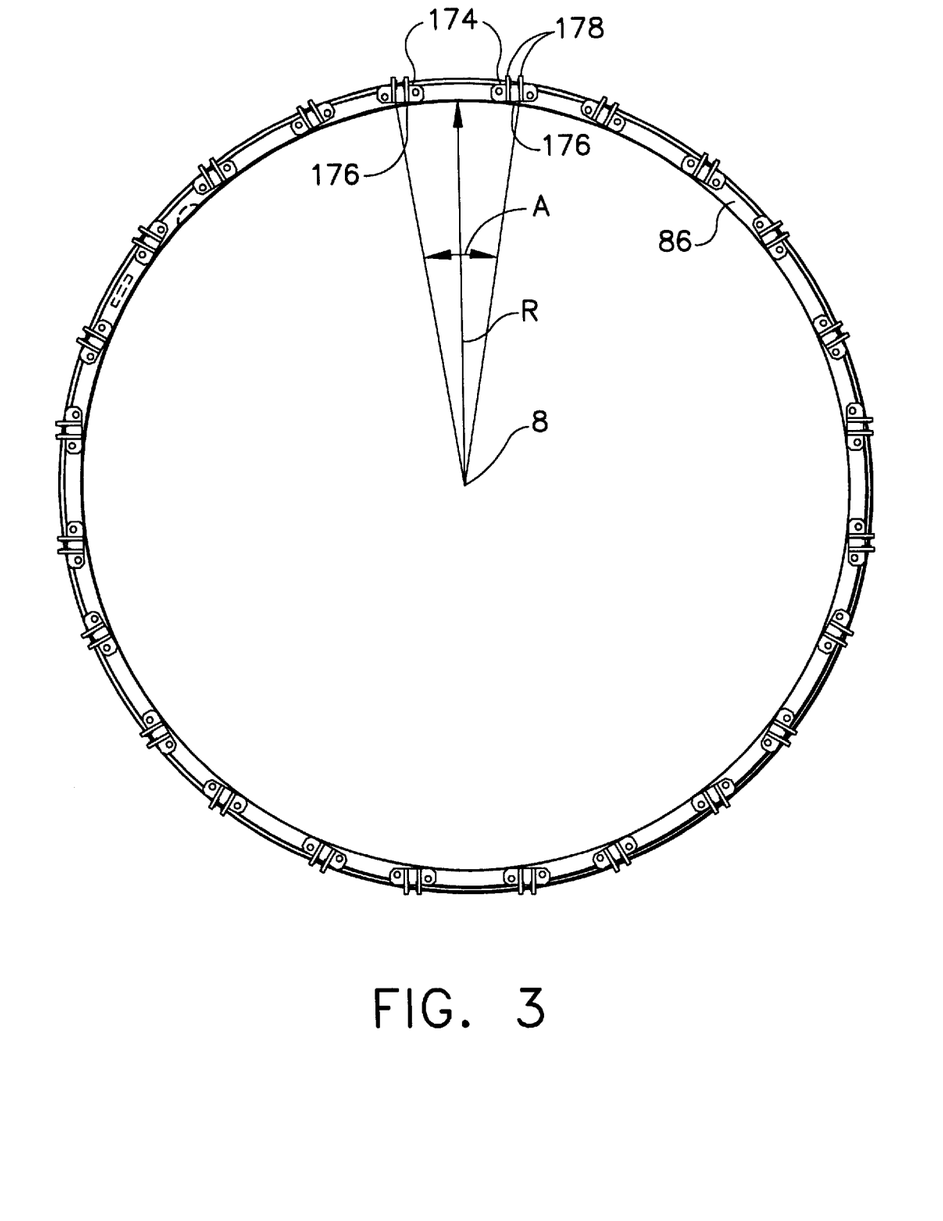
FIG. 3 is an aft looking forward elevational view of the actuating ring shown in FIG. 1.
Figure 4:
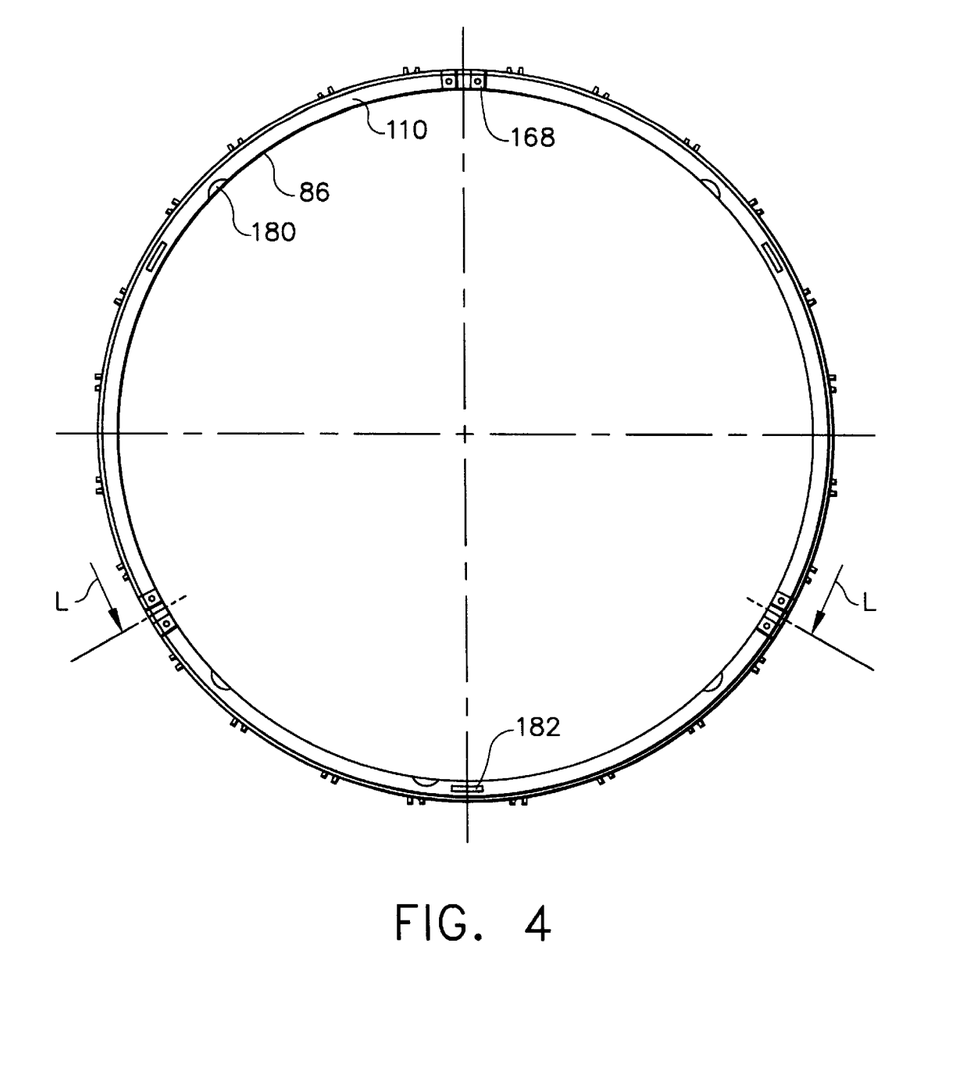
FIG. 4 is a forward looking aft elevational view of the actuating ring shown in FIG. 3.

The spherical joints 82 which connect the control arms 58a and 58b to the actuating ring 86 as illustrated in FIG. 1 provide a flap actuation linkage means that is more specifically illustrated in FIG. 3 by matched pairs 174 of lug mounts 176 wherein each of the lug mounts have pairs of parallel lugs 178 extending therefrom. The lug mounts 176 are circumferentially disposed around and structurally connected to the aft wall 114 and all of their lugs 178 are parallel to a radius R extending from the centerline 8 and bisecting a mean angle A between the lug mounts 176 wherein the mean angle A has its origin at the centerline. Each matched pair of lug mounts 176 connects a corresponding one of the control arms 58a and 58b to the actuating ring 86.

Figure 5:
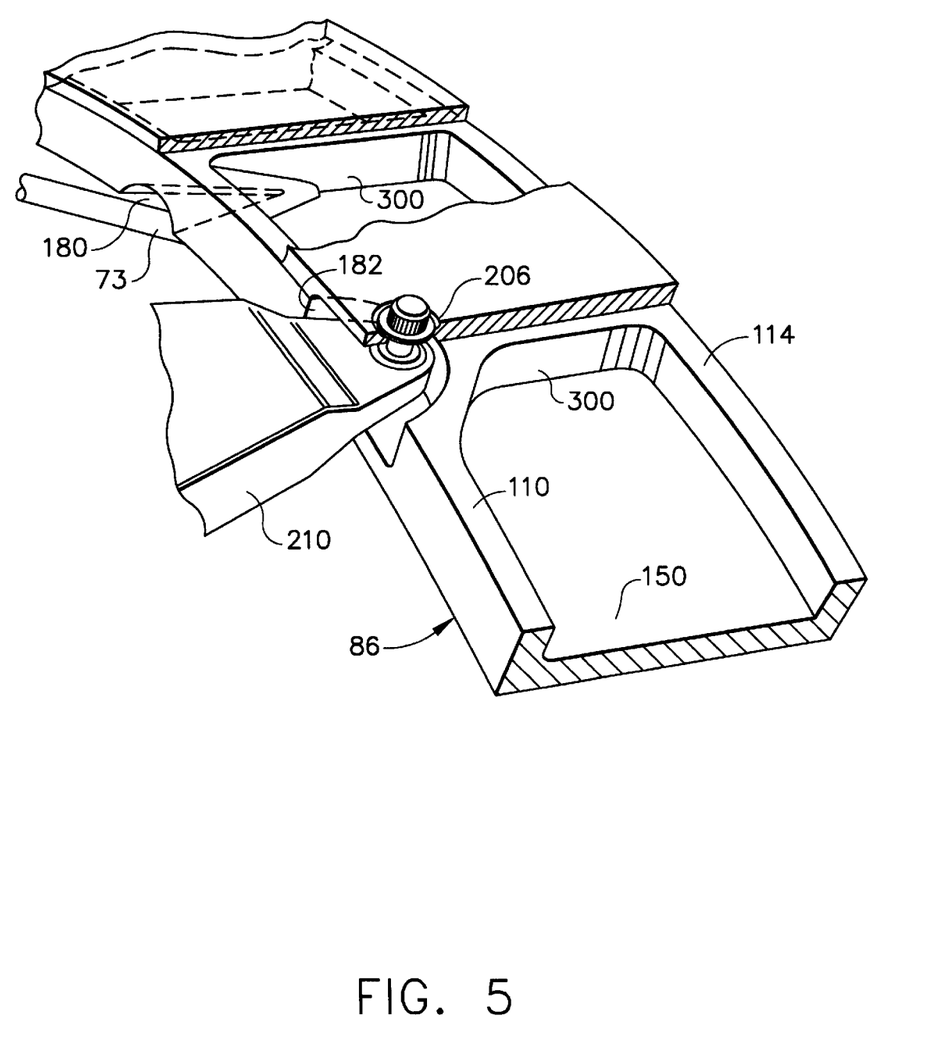
FIG. 5 is another enlarged partial cut away perspective view of a portion of the actuating ring in FIG. 1.

FIG. 5 illustrates the position of carved out features formed in the actuating ring 86 which is exemplified by a conical channel 180 and a semi-cylindrical notch 182. The conical channel 180 provides clearance for the actuator rod 73 of the primary actuator 70 (shown in FIG. 1) which is more specifically illustrated in FIG. 5. The semi-cylindrical notch 182 provides an area to mount spherical joint 206 which joins A-frame 210 to the actuating ring 86 which is more specifically illustrated in FIG. 2. Reinforcement struts 300 axially extending between the forward and aft walls 110 and 114 respectively at the circumferential positions of these carved out features. The carved out features such as conical channel 180 and semi-cylindrical notch 182 are preferably formed in the reinforcement struts 300 themselves. The reinforcement struts 300 help to structurally strengthen the actuating ring 86 where these carved out features would normally decrease its strength and enables nozzles to be designed with smaller diameters. The actuating rings may be designed with smaller profiles and smaller radial heights, thus allowing the overall nozzle actuation system and the nozzle itself to be more compact. The reinforcement struts 300 are preferably integrally formed as one piece by casting or some other means along with the inner cover 150, the structural brace 132, the struts 118, and the forward and aft walls 110 and 114 respectively.

While the preferred embodiment of our invention has been described fully in order to explain its principles, it is understood that various modifications or alterations may be made to the preferred embodiment without departing from the scope of the invention as set forth in the appended claims.

Having thus described what is considered novel and desired to be secured by Letter Patent of the United States, We claim:

1. A hollow actuating ring for simultaneously pivoting flaps of an aircraft gas turbine engine nozzle, said actuating ring comprising:

a hollow generally annular structure having axially spaced apart coaxial forward and aft walls, joining struts axially extending between and structurally joining together said forward and aft walls, and a ring stiffening means for decreasing the effective ring bending and torsional length of said aft wall between said joining struts.

2. A hollow actuating ring as claimed in claim 1 wherein said stiffening means comprises a means for spreading out loads transferred from said joining struts to said aft wall.

3. A hollow actuating ring as claimed in claim 1 wherein said stiffening means comprises A-frames formed between said joining struts and said aft wall.

4. A hollow actuating ring as claimed in claim 3 further comprising annular inner and outer covers structurally joined to radially inner and outer ends respectively of said forward and aft walls, said joining struts, and said ring stiffening means.

5. A hollow actuating ring as claimed in claim 4 further comprising carved out features formed in reinforcement struts axially extending between and structurally joining together said forward and aft walls.

6. A hollow actuating ring as claimed in claim 5 further comprising annular inner and outer covers structurally joined to radially inner and outer ends respectively of said forward and aft walls, said joining struts, said ring stiffening means, and said reinforcement struts.

7. A hollow actuating ring as claimed in claim 6 wherein said annular inner and outer covers are integrally formed as an essentially one-piece structure together with said forward and aft walls, said joining struts, said ring stiffening means, and said reinforcement struts.

8. A hollow actuating ring as claimed in claim 7 further comprising flap joining means circumferentially disposed around and structurally connected to said aft wall of said structure and actuator joint means structurally connected to said joining struts.

9. A hollow actuating ring as claimed in claim 8 further comprising conical channels carved into said reinforcement struts wherein said conical channels are constructed to allow actuator rods of the nozzle to pass through said reinforcement struts.

10. A hollow actuating ring as claimed in claim 8 further comprising spherical joints, each of which is mounted in semi-cylindrical notches carved into said reinforcement struts.

11. A hollow actuating ring as claimed in claim 4 wherein said annular inner and outer covers are integrally formed as an essentially one-piece structure together with said forward and aft walls, said joining struts, and said ring stiffening means.

12. A hollow actuating ring as claimed in claim 4 further comprising flap joining means circumferentially disposed around and structurally connected to said aft wall of said structure and actuator joint means structurally connected to said joining struts.

13. A hollow actuating ring as claimed in claim 12 wherein said A-frames have filleted interior corners.

14. A hollow actuating ring as claimed in claim 12 wherein said flap joining means and said actuator joint means further comprise, spherical joint elements.

15. A hollow actuating ring as claimed in claim 3 wherein said A-frames have filled interior corners.

16. A hollow actuating ring as claimed in claim 1 wherein said stiffening means comprises at least one structural brace extending diagonally between each of said joining struts and said aft wall.

17. A hollow actuating ring as claimed in claim 16 further comprising annular inner and outer covers structurally joined to radially inner and outer ends respectively of said forward and aft walls, said joining struts, and said ring stiffening means.

18. A hollow actuating ring as claimed in claim 14 further comprising flap joining means circumferentially disposed around and structurally connected to said aft wall of said structure and actuator joint means structurally connected to said joining struts.

19. A hollow actuating ring as claimed in claim 1 wherein said ring stiffening means comprises at least one structural brace extending from a point where one of said joining struts intersects one of said forward and aft walls to the other one of said forward and aft walls.

* * * * *